United States Patent
Gohr et al.

(10) Patent No.: US 11,648,597 B2
(45) Date of Patent: May 16, 2023

(54) WALL THICKNESS MONITORING WHILE STRETCH-REDUCING TUBES

(71) Applicant: SMS group GmbH, Düsseldorf (DE)

(72) Inventors: Alexander Gohr, Mönchengladbach (DE); Peter Thieven, Aachen (DE)

(73) Assignee: SMS group GmbH, Düsseldorf (DE)

( * ) Notice: Subject to any disclaimer, the term of this patent is extended or adjusted under 35 U.S.C. 154(b) by 116 days.

(21) Appl. No.: 17/283,267

(22) PCT Filed: Oct. 10, 2019

(86) PCT No.: PCT/EP2019/077431
§ 371 (c)(1),
(2) Date: Apr. 7, 2021

(87) PCT Pub. No.: WO2020/074620
PCT Pub. Date: Apr. 16, 2020

(65) Prior Publication Data
US 2021/0379635 A1 Dec. 9, 2021

(30) Foreign Application Priority Data

Oct. 11, 2018 (DE) ...................... 10 2018 217 378.8

(51) Int. Cl.
*B21B 37/16* (2006.01)
(52) U.S. Cl.
CPC .................. *B21B 37/165* (2013.01)
(58) Field of Classification Search
CPC ....... B21B 17/14; B21B 37/165; B21B 37/78; B21B 38/04; G05D 5/02
See application file for complete search history.

(56) References Cited

U.S. PATENT DOCUMENTS

| | | |
|---|---|---|
| 3,496,745 A | 2/1970 | Kocks |
| 4,323,971 A | 4/1982 | Moltner et al. |
| | (Continued) | |

FOREIGN PATENT DOCUMENTS

| | | |
|---|---|---|
| DE | 2947233 A1 | 5/1981 |
| DE | 3643659 A1 | 7/1988 |
| | (Continued) | |

OTHER PUBLICATIONS

JP 03-138008A, Fushima et al., Jun. 1991.*

(Continued)

*Primary Examiner* — Edward T Tolan
(74) *Attorney, Agent, or Firm* — Smartpat PLC

(57) ABSTRACT

A controller (2) and method for controlling a stretch-reducing mill (1) for rolling tubes are presented. The stretch-reducing mill (1) has several roll stands (10) arranged behind one another in a conveying direction (F) of the tubes (R) and at least one outlet-side wall thickness measuring device (20). The controller (2) is set up to receive measurement data from the wall thickness measuring device (20) which identifies one or more outlet-side wall thicknesses ($s_r$) of a tube (R) exiting from the last roll stand (10) and one or more of the received measurement data wall thickness on the inlet-side ($s_{l\_t}$), preferably to determine an inlet-side wall thickness profile of the tube (R) before entering the first roll stand (10), and preferably to calculate and control one or more of the roll stands (10), taking into account the determined inlet-side wall thicknesses ($s_{l\_t}$).

15 Claims, 2 Drawing Sheets

(56) References Cited

U.S. PATENT DOCUMENTS

2006/0053855 A1   3/2006  Yamane
2006/0272373 A1  12/2006  Yamane
2020/0391263 A1* 12/2020  Gohr ........................ B21B 17/14

FOREIGN PATENT DOCUMENTS

| DE | 3819571 A1 | 12/1989 |
|---|---|---|
| DE | 4039741 | 3/2005 |
| RU | 2311243 C2 | 11/2007 |
| SU | 482220 A1 | 8/1975 |

OTHER PUBLICATIONS

DE 19825388A1, Kummerling et al., Dec. 1998.*
JP 60-21114A, Funiyu et al., Feb. 1985.*
JP 62-124007A, Funiyu et al., Jun. 1987.*
JP 60-177907A, Sato et al., Sep. 1985.*
Translation DE 3819571A, Kummerling et al., Dec. 1989.*
Translation JP 62-124007A, Funiyu et al., Jun. 1987.*
Translation JP 60-177907A, Sato et al., Sep. 1985.*
WO 2005/095013A1, Inage et al. Oct. 2005.*
H. Biller, "Das Reduzieren von Rohren, Theorie und Anwendung" in Herstellung von Rohren, Düsseldorf, Verl. Stahleisen, 1975, pp. 48-63, ISBN 3-514-00166-9.

* cited by examiner

WALL THICKNESS MONITORING WHILE STRETCH-REDUCING TUBES

TECHNICAL FIELD

The disclosure relates to a controller for controlling a stretch-reducing mill for the rolling of tubes, which has several roll stands arranged behind one another in a conveying direction of the tubes and a wall thickness measuring device arranged on the outlet-side.

BACKGROUND

In the production of seamless tubes, a stretch-reducing mill is used, which has several roll stands arranged behind one another in the conveying direction of the tube. The reduction in the tube diameter from one stand to another is accompanied by a stretching of the tube in the axial direction and thus an increase in the material speed of the tube in the rolling direction. Correspondingly, the roll speeds in the rolling or conveying direction must also increase from one stand to another. The reduction in diameter is also associated with a change in the tube wall thickness. In the case of large differences in speed between adjacent stands, the stretching can become so great that the tube wall thickness is reduced. Conversely, with small differences in speed, the tube wall thickness can increase.

Due to fluctuations in the wall thickness, among other things, of the rolling material entering the stretch-reducing mill, the rolled material exiting the stretch-reducing mill can also have fluctuations in wall thickness. Such fluctuations are caused by, for example, inhomogeneous rolling conditions, such as changes in the rolling temperature, uneven wear of tools that are in circulation in preliminary units, etc. For this reason, stretch-reducing mills can be equipped with control systems to control the exiting wall thickness or to improve the tolerance.

A known technical solution influences the elongation of the tube to be rolled by means of a targeted change in the speed of the roll stands. For example, if a section of the incoming tube is rolled with a wall that is too thick relative to a nominal value, a steeper speed curve, i.e., an increase in speed differences between adjacent roll stands, can increase the elongation and thus reduce the wall thickness more. If, in the other case, a section is rolled with a wall that is too thin relative to a target value, then the current stretching in the stretch-reducing mill can be reduced by means of a flatter speed curve. In this way, there is a compensation for wall thickness fluctuations of the incoming tube, and thus an equalization of the wall thickness of the exiting tube and an improvement in the rolling quality.

The known speed controls of the roll stands that compensate for wall thickness fluctuations in the inlet tube require a measuring station to record the wall thickness of the tube entering the stretch-reducing mill. For example, DE 2947233 A1 discloses an adjustment device for controlling the total thickness of a stretch-reducing mill. A wall thickness measuring device, such as an isotope radiation measuring device, is provided on the inlet-side. A similar technique is known from U.S. Pat. No. 3,496,745 A. Both use a radiometric wall thickness measurement in the inlet-side, by means of which a control loop is set up or a precontrol of the speeds of the roll stands is carried out. In practice, in addition to the wall thickness measurement at the inlet-side, a wall thickness measurement at the outlet side is also required to check the success of the wall thickness control. The wall thickness measurement at the outlet-side is also necessary for the correct detection of the thickened tube ends.

The provision of an inlet-side and an outlet-side wall thickness measuring device is associated with high acquisition and operating costs. In addition, there are operational problems and safety aspects, especially when using radiometric measuring devices that use highly radioactive radiation sources. As a result, in practice, stretch-reducing mills often do without continuous wall thickness measurement and thus cannot implement local wall thickness control.

SUMMARY

One object of the disclosure is to improve wall thickness control in the stretch-reducing mill.

The object is achieved with a controller and a method as claimed.

The controller is used to control a stretch-reducing mill which is designed for the rolling of tubes. The tubes are preferably seamless, cylindrical tubes made of a metal material. The stretch-reducing mill has several roll stands arranged behind one another in a conveying direction of the tubes. A tube to be rolled, which enters the stretch-reducing mill, passes through the roll stands, whereby the tube is stretched in the longitudinal direction with a suitable speed curve and the tube wall thickness is changed. The stretch-reducing mill furthermore has at least one wall thickness measuring device at the outlet-side which is set up to measure wall thicknesses of the tubes exiting from the last roll stand, which are also referred to herein as "outlet-side wall thicknesses". The terms "in front of" and "behind" refer here and in the following to the conveying direction of the tubes, unless otherwise described. The wall thickness measuring device at the outlet-side is therefore used to measure the wall thickness of the rolled tube. For this purpose, the outlet-side wall thickness measuring device is preferably arranged directly or at least as close as possible behind the last roll stand. The measurement is preferably carried out without contact. It can be based on a radiometric principle. The wall thickness measuring device at the outlet-side can have a radiator, for example a cesium radiator, and a detector, which are set up so that the attenuation of the radiation emitted by the radiator is measured by the detector after passing through a tube cross-section (perpendicular to the longitudinal direction). However, the wall thickness of the tube on the outlet-side can also be measured in other ways. This also includes in particular indirect measurement methods in which the wall thickness is not measured directly, but one or more other physical parameters are measured from which the wall thickness can be calculated.

The controller is set up to receive measurement data from the wall thickness measuring device which characterize one or more outlet-side wall thicknesses of a tube exiting from the last roll stand. The measurement data are preferably transmitted electronically, for example digitally by means of a cable or wirelessly. The measurement data can represent the wall thicknesses in an appropriate physical unit or, alternatively, include information from which the controller can derive the wall thicknesses. The measurement data preferably comprises several local wall thicknesses, i.e. several wall thicknesses of one and the same tube along its length. A set of several wall thicknesses depending on the local location or the local axial position of the tube is also referred to hereinafter as "wall thickness profile". The wall thickness profile can be displayed and/or represented internally in various ways, for example in a discrete, quasicontinuous or continuous manner (for example by means of a continuous, differentiable function). By measuring several wall thicknesses on the outlet-side of the tube, which exits the last roll stand at a certain speed, cyclically or in some other way as a function of time, a wall thickness profile of the rolled tube can be created in the wall thickness measuring device or in the controller.

The controller is also set up to determine one or more inlet-side wall thicknesses from the received measurement data. This can occur in that the wall thicknesses measured on the outlet-side serve as initial conditions for a model calculation, such as a material flow simulation or by carrying out back-calculations in some other way, preferably iteratively. The theoretical inlet-side wall thicknesses determined in this way do not have to exactly match the actual inlet-side wall thicknesses. It suffices that their application (described later) leads to an improvement in the rolling quality, in particular to a greater uniformity of the wall thickness profile on the outlet-side. From the theoretically derived inlet-side wall thicknesses—as described above with reference to the measured outlet-side wall thicknesses—the controller can determine or calculate a theoretical inlet-side wall thickness profile.

The controller is also set up to control one or more of the roll stands, taking into account the theoretical wall thicknesses on the inlet-side. For this purpose, the controller preferably delivers electronic signals or commands, wirelessly or by cable, to the roll stands. The roll stands can preferably be controlled or regulated individually, but they can also be controlled in groups. The terms "control", "regulate", etc. include, in particular, controlling the speed of the working rolls of the roll stands, although the control of other or further rolling parameters may also be included, such as the roll pressure, the adjustment of the working rolls, etc.

The proposed technical solution, which is based on a back-calculation of the inlet-side tube wall thickness(es) from the measured outlet-side tube wall thickness(es), offers a compromise between the investment and the operating costs of the stretch-reducing mill and the improvement of the rolling accuracy by taking into account the fluctuations of inlet-side wall thicknesses. The solution enables the requirements of measurement technology to be reduced without having to forgo a control based on the inlet-side wall thicknesses. In this way, conventional local wall thickness control of the stretch-reducing mill can be used, with the back-calculated wall thicknesses being used as input signals instead of the wall thicknesses that are measured on the inlet-side. It should be noted that a back-calculation is also useful if technical means are available to measure the wall thickness on the inlet-side. On the one hand, in this case, malfunction situations can be overcome in the event of failure of the inlet-side wall thickness measurement without having to interrupt or stop the operation of the system. On the other hand, an adaptation of the control model and/or an error detection can be carried out by comparing between the back-calculated tube wall thicknesses and those measured on the inlet-side. If the control model or the controller is functioning correctly, the speed curve determined by the control model for a specific inlet-side wall thickness profile must be able to be used in a back-calculation to determine the inlet-side wall thickness or the inlet-side wall thickness profile from the outlet-side wall thickness profile. A larger difference between the actual inlet-side wall thickness profile and the rear facing inlet-side wall thickness profile indicates errors in the control system.

The controller is preferably set up to determine a deviation from one or more setpoint values from the theoretically determined inlet-side wall thicknesses. The working parameters of the roll stands can be corrected from the deviation in order to achieve dynamic wall thickness control.

The control of the roll stand(s) preferably comprises at least one speed regulation and/or one speed correction of the working rolls thereof. If, for example, a section of the incoming tube is rolled whose wall thickness according to the back-calculation is or is assumed to be greater than a nominal value, a steeper speed curve, i.e., an increase in the speed differences between neighboring roll stands, can increase the elongation and thus further reduce the wall thickness. If, in the other case, a section is rolled whose wall thickness, according to the back-calculation, is smaller than a target value or is assumed to be smaller than a nominal value, the current stretching in the stretch-reducing mill can be reduced by a flatter speed curve. In this way, there is compensation for wall thickness fluctuations on the incoming tube and therefore greater uniformity of the wall thickness of the outgoing tube.

The controller is preferably set up to use the theoretically determined inlet-side wall thicknesses for controlling the wall thickness of one or more subsequent tubes. The term "subsequent" should be seen here in relation to the tube (analogous to several tubes) which serve as the basis for the back-calculation. In the simplest case, for example, the back-calculated tube wall thickness profile or a mean value from several calculated tube wall thickness profiles is assumed as an approximation for the actual tube wall thickness profile of a subsequent tube. With this theoretical profile as a basis or as an input, the dynamic speed correction of the roll stands takes place.

The controller is preferably set up to create a forecast of the wall thicknesses, preferably the wall thickness profile, of subsequent tubes from the theoretically determined inlet-side wall thicknesses. For example, the creation of the forecast can include an analysis of cyclically recurring and/or statistical regularities. For example, similar wall thickness deviations can occur at equivalent points in successive tubes, or wall thickness profiles that are repeated after a number of tubes. For these reasons, the controller is preferably set up to examine the inlet-side tube wall profiles calculated for such characteristics—for example properties which are common to all tubes or which recur periodically—and to predict the wall thickness profile of subsequent tubes therefrom. In this way, the accuracy of the calculated inlet-side wall thickness profiles can be improved. Based on this preferred exemplary embodiment, it may be useful if the controller does not start correcting the speed of the roll stands until it has recognized these regularities with a certain degree of certainty in the tube wall thickness profile and/or the number of tools in circulation from preliminary units. Recognized patterns and systematic errors can also be reported to the rolling mill operator in order to be able to identify problems in previous units of the stretch-reducing mill.

The controller is preferably also set up to compare the theoretically determined inlet-side tube wall thicknesses with the measured outlet-side tube wall thicknesses. Such a comparison can be used, on the one hand, to perform a plausibility check of the back-calculation or forecast and, on the other hand, to perform an adaptive correction of the control behavior of the controller in order to further optimize the rolling result.

A further improvement in the forecast quality and/or rolling quality can be achieved if the calculated inlet-side tube wall thickness profile is corrected by a measured mean value of the inlet-side wall thickness. Such a wall thickness mean value can be determined, for example, by measuring the weight, the length and/or the diameter of the incoming tube, which is technically comparatively simple and inexpensive.

The stretch-reducing mill preferably also has an inlet-side wall thickness measuring device which is set up to measure inlet-side wall thicknesses of tubes entering the first roll stand, wherein the controller is being set up to compare the measured inlet-side wall thicknesses with the theoretically determined inlet-side wall thicknesses. According to this preferred exemplary embodiment, a wall thickness measuring device is thus arranged in front of the first roll stand. On the one hand, in this case, malfunction situations can be overcome in the event of failure of the inlet-side wall thickness measurement without having to interrupt or stop the operation of the system. On the other hand, an adaptation of the control model and/or an error detection can be carried out by comparing between the back-calculated tube wall thicknesses and those measured on the inlet-side.

A stretch-reducing mill for the rolling of tubes has several roll stands arranged behind one another in the conveying direction of the tubes, wherein at least one outlet-side wall thickness measuring device is set up to measure the outlet-side wall thickness of tubes exiting from the last roll stand, and wherein a controller is set up according to the embodiments set out above.

A method is used to control a stretch-reducing mill for the rolling of tubes, which has several roll stands arranged behind one another in the conveying direction of the tubes, wherein at least one outlet-side wall thickness measuring device is set up to measure the outlet-side wall thicknesses of tubes exiting from the last roll stand, and wherein the method comprises: Measuring one or more outlet-side wall thicknesses of a tube by the wall thickness measuring device; theoretical determination or calculation of one or more inlet-side wall thicknesses, preferably an inlet-side wall thickness profile, of the tube before entering the first roll stand from the measured outlet-side wall thicknesses; and controlling one or more of the roll stands taking into account the theoretically determined inlet-side wall thicknesses.

The characteristics, technical effects, advantages and exemplary embodiments which have been described in relation to the controller and the stretch-reducing mill apply analogously to the method.

Further advantages and features of the present invention are evident from the following description of preferred exemplary embodiments. The features described there can be implemented alone or in combination with one or more of the features set out above, insofar as the features do not contradict one another. The following description of the preferred embodiments is made with reference to the accompanying drawings.

DETAILED DESCRIPTION

Preferred exemplary embodiments are described below with reference to FIG. 1.

Figure 1:
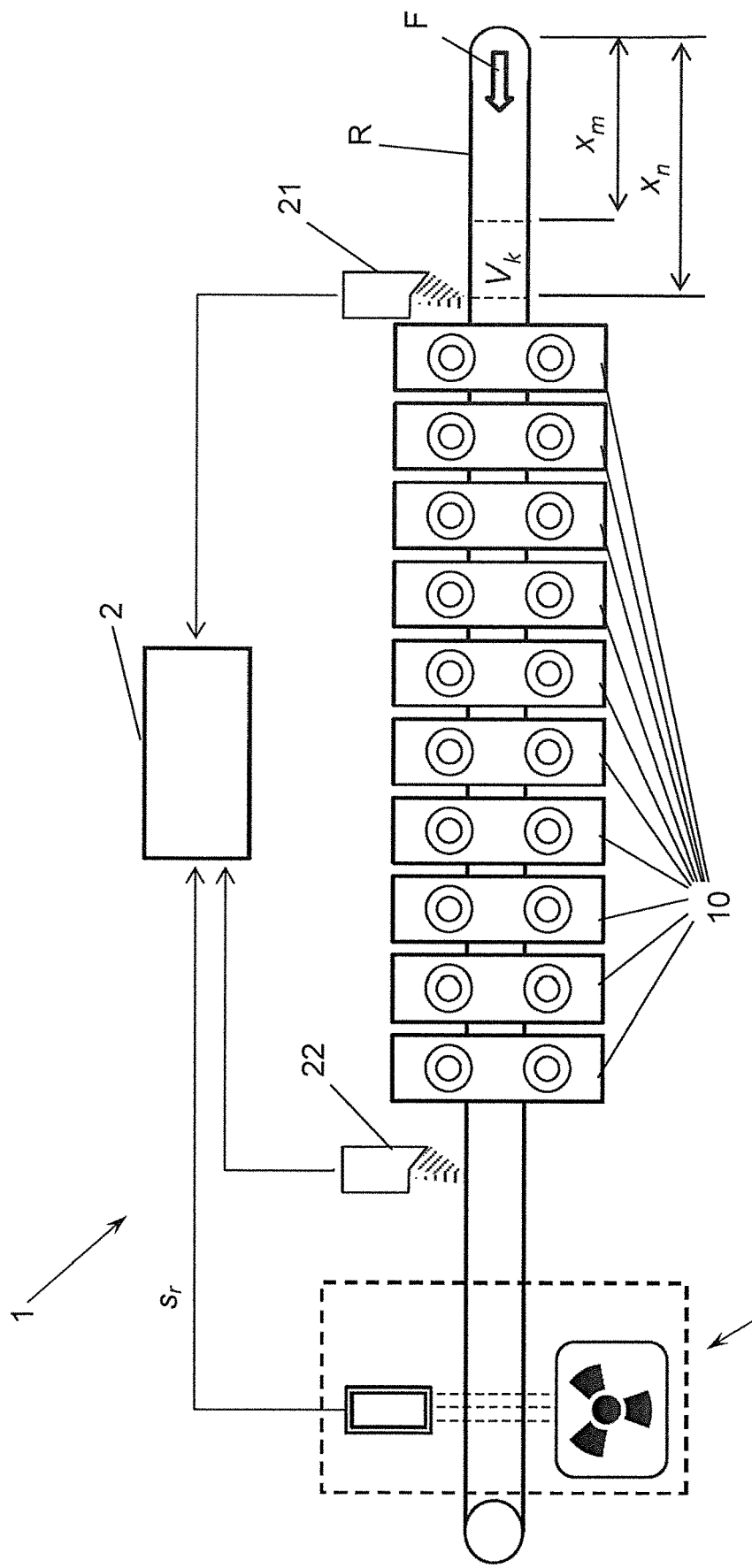
FIG. 1 shows a schematic view of a stretch-reducing mill with a wall thickness measuring device on the outlet-side.

FIG. 1 shows a schematic view of a stretch-reducing mill 1. The stretch-reducing mill 1 has several roll stands 10, here ten as an example. The roll stands 10 are preferably individually controllable. In particular, the speeds of the work rolls (not shown in FIG. 1) of the roll stands 10 can be set individually.

The roll stands 10 are controlled via a controller 2, preferably via a computer. If necessary, the controller 2 takes over the control of further components of the stretch-reducing mill 1. It should be pointed out that the term "controller" includes both centralized and decentralized structures for controlling the stretch-reducing mill 1. The controller 2 therefore does not have to be at the "location" of the stretch-reducing mill 1 or part of it. In addition, control tasks, data processing steps, etc. can be distributed to different computing devices, which then fall under the term "controller" as a whole. Furthermore, the communication of the controller 2 with the components to be controlled can take place both physically via cable and wirelessly.

To roll a tube R, it passes in a conveying direction F through the stretch-reducing mill 1. Before entering the stretch-reducing mill 1, the tube R has an inlet-side wall thickness $S_i$, which can fluctuate along the longitudinal extension of the tube R, i.e., locally. When it exits from the last roll stand 10, the tube R has a changed wall thickness $s_r$.

The outlet-side wall thickness $s_r$ is measured by means of a wall thickness measuring device 20, which can be, for example, a radiometric measuring device. The measurement is preferably carried out without contact, such as by measuring the attenuation of the radiation emitted by a radiator, for example a cesium radiator. However, the outlet-side wall thickness $s_r$ of the tube R can also be measured in other ways. This also includes in particular indirect measurement methods in which the wall thickness is not measured directly, but one or more other physical parameters are measured from which the wall thickness can be calculated.

In addition to the wall thickness measurement on the outlet-side, other parameters can optionally be measured, such as the inlet-side and/or outlet-side speed of the tube R, which is measured by means of speed measuring devices 21 and 22, the inlet-side and/or outlet-side weight of the tube R, etc. Such technical means are omitted in FIG. 1 for the sake of clarity.

The measured values from the wall thickness measuring device 20 and any further measuring stations are transmitted to the controller 2. The measurements can essentially be carried out continuously or discretely, i.e., in cycles.

The measured outlet-side tube wall thickness $s_r$ (more generally: the tube wall thickness profile measured on the outlet-side) is used by the controller 2 in order to theoretically derive the inlet-side tube wall thicknesses $s_{i,t}$ (more generally: the tube wall thickness profile on the inlet-side). Such a back-calculation can take place, for example, by means of a material flow simulation, described in detail below.

The calculated or simulated inlet-side tube wall thickness profile is now used by the controller 2 as an input variable for the local wall thickness control of subsequent tubes R or tube sections. In the simplest case, for example, the back-calculated tube wall thickness profile or a mean value from several calculated tube wall thickness profiles is assumed as an approximation for the actual tube wall thickness profile. With this theoretical profile as a basis, the dynamic speed correction of the roll stands 10 takes place.

It has been found in practice that deviations in the tube wall thickness can have regular properties, in particular cyclic or periodic. For example, similar wall thickness deviations can occur at equivalent points in successive tubes R, or wall thickness profiles that are repeated after a certain number of tubes R. The first case occurs, for example, when there are problems with the heating of the starting material, which is reflected in the incoming wall thickness $s_1$ of the tube R. The second case occurs, for example, when individual tools in the preliminary units, such as hole plugs or rolling bars, are worn out or are more worn out than others. Since such tools are often used in circulation in the preliminary units, worn tools and the wall thickness deviations caused by them appear with a certain periodicity, which corresponds to the number of tools used in circulation. For these reasons, the controller 2 is preferably set up to examine the inlet-side tube wall profiles calculated for such characteristics—for example characteristics which are common to all tubes R or which recur periodically—and to predict the wall thickness profile of subsequent tubes R therefrom. In this way, the accuracy of the calculated wall thickness profiles can be improved.

Based on this preferred exemplary embodiment, it can be useful if the controller 2 only begins to apply correction speeds for the roll stands 10 when these regularities are recognized with a certain degree of certainty in the tube wall thickness profile and/or the number of tools in circulation in the preliminary units.

A further improvement in the forecast quality can be achieved if the calculated inlet-side tube wall thickness profile is corrected by a measured mean value of the inlet-side wall thickness. Such a wall thickness mean value can be determined, for example, by measuring the weight, the length, and the diameter of the incoming tube R, which is technically comparatively simple and inexpensive.

According to a further exemplary embodiment, the controller 2 can carry out a comparison between the calculated inlet-side tube wall thicknesses $s_{l\_t}$ and the measured inlet-side tube wall thicknesses $s_l$. Such a comparison can be used, on the one hand, to perform a plausibility check of the back-calculation or forecast and, on the other hand, to perform an adaptive correction of the control behavior of the controller 2 in order to further optimize the rolling result. In this way, for example, the usage periods and/or amounts of the changes in the rotational speed of the roll stands 10 made for a wall thickness deviation can be automatically adjusted.

The proposed technical solution, which is based on a back-calculation of the inlet-side tube wall thicknesses $s_{l\_t}$ from the outlet-side tube wall thicknesses $s_r$, offers a compromise between investment and operating costs of the stretch-reducing mill and an improvement in the rolling accuracy, which is aimed for by taking into account the inlet-side wall thickness fluctuations. The theoretically determined inlet-side wall thicknesses $s_{l\_t}$ do not have to exactly match the actual inlet-side wall thicknesses $s_l$. It is sufficient if their application leads to an improvement in the rolling quality.

The back-calculation described is also useful if technical means are available for measuring the tube wall thickness on the inlet-side. On the one hand, in this case, malfunction situations can be overcome in the event of failure of the inlet-side wall thickness measurement without having to interrupt or stop the operation of the system. On the other hand, an adaptation of the control model and/or an error detection can be carried out by comparing between the back-calculated tube wall thicknesses and those measured on the inlet-side.

In the following, a method for calculating an inlet-side tube wall profile is presented with reference to FIG. 2. For this purpose, the controller is configured to assign an incoming tube wall thickness to the measured tube wall thickness on the outlet-side. The boundary conditions are the speed setting of the roll stands 10 of the stretch-reducing mill 1, since these determine the rolling tension and stretching. The tube R on the inlet-side is hereinafter referred to as a "shell" for differentiation.

Calculation methods are known which can be used to calculate the speeds of a stretch-reducing mill in order to roll a desired tube wall thickness from a specified inlet-side shell wall thickness, see for example: H. Biller, "The reduction of tubes, theory and application" in "Production of tubes", Düsseldorf 1975, pages 48-63.

The calculation methods are reversible, i.e., with a given tube wall thickness and known speeds, the associated shell wall thickness can be calculated on the inlet-side. In simplified terms, an inverse function is carried out, which calculates the shell wall thickness on the inlet-side from the roll speeds and the tube wall thickness:

$$s_l = F^{-1}(n_i, s_r) \tag{1}$$

Here, $s_l$ is the inlet-side wall thickness of the shell, $n_i$ is the roller speed of the i-th roll stand 10 and $s_r$ is the outlet-side wall thickness of the tube R.

In the simplest case, the inverse function is solved by trial and error, i.e., by specifying a shell wall thickness on a trial basis. A series of speeds is calculated from this in order to obtain the tube wall thickness from this assumed shell wall thickness. If the determined speeds deviate from the target speeds, the shell wall thickness is changed until the desired speed range is reached or at least the deviations between the specified values and the calculated speed range are less than an error threshold.

However, this relatively simple method is not readily suitable for calculating the local wall thickness profile. This is in particular due to the fact that the speeds of the rolls in the stretch-reducing mill 1 are generally not constant over time, but are subject to variations over time in order to obtain a targeted influence on the stretching of the stretch-reducing mill 1, for example to control the thickness of the end of the tube or the local control of the wall thickness. Therefore, the above-mentioned inversion of the speed calculation cannot necessarily be carried out immediately without possibly receiving large errors in the calculated shell wall thickness.

The calculation of a shell wall thickness profile from the measured wall thickness profile of a tube R can, however, be improved by an iterative procedure and simple metrological measures. According to one embodiment, in addition to the outlet-side wall thickness measuring device, two speed measuring devices 21, 22—preferably operating without contact—are set up on the inlet-side of the stretch-reducing mill 1 and on the outlet-side immediately in front of and behind the stretch-reducing mill 1, see FIG. 1. Such measuring devices are comparatively inexpensive and easy to maintain and service. The measured values of both speed measuring devices 21, 22 are fed to a measured data memory of the controller 2 in a synchronized manner. The purpose of the speed measuring devices 21, 22 is to accurately record the material flow through the stretch-reducing mill 1.

Figure 2:
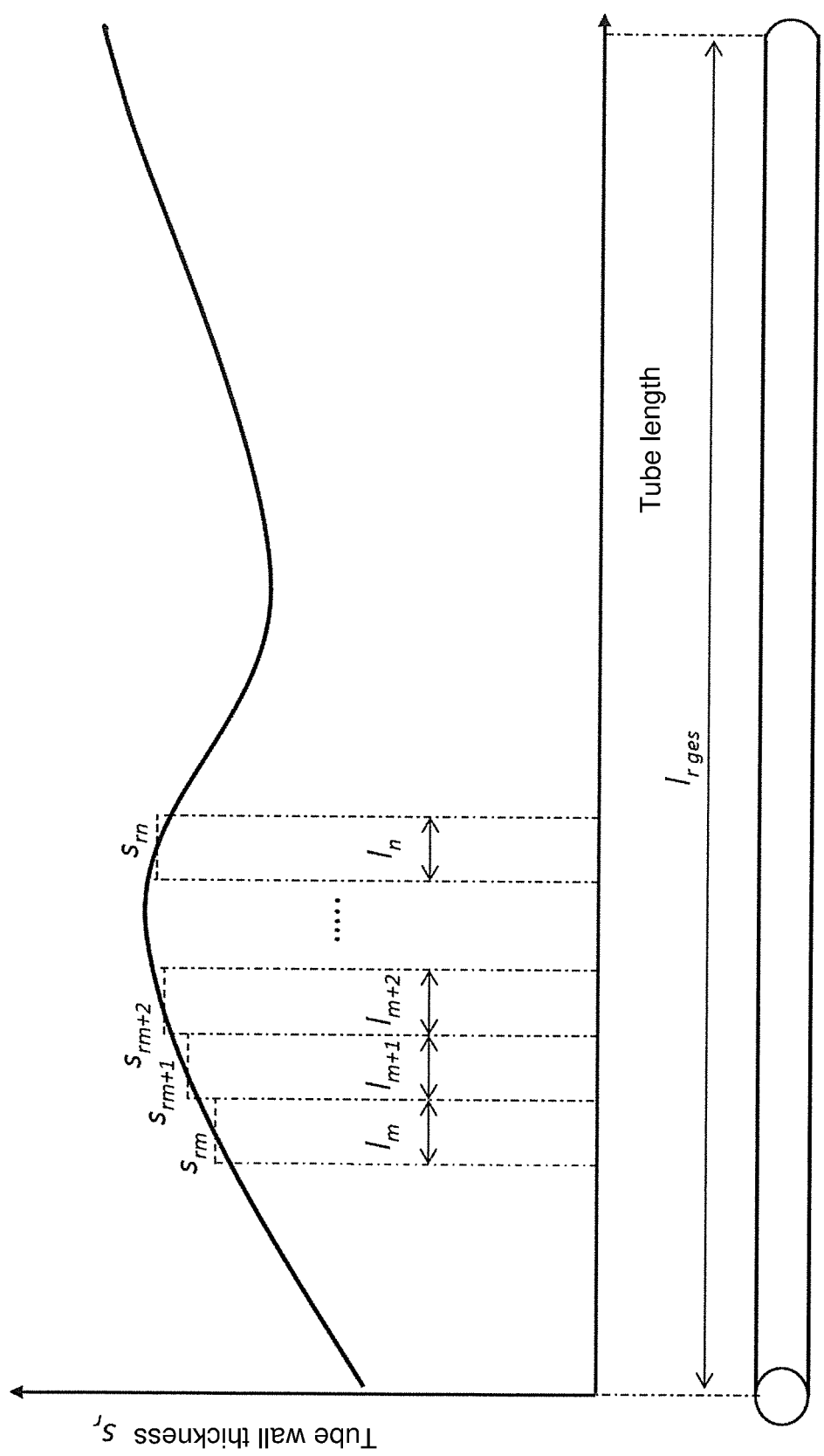
FIG. 2 is a diagram showing an exemplary tube wall thickness as a function of the position in the axial direction of the tube, for explaining an iterative method for calculating an inlet-side tube wall profile.

The outlet-side wall thickness measuring device 20 in turn provides the controller 2 with a sectional wall thickness profile of the tube R, in which a mean wall thickness $s_j$, which is assumed to be constant in the section j, is specified for small sections j of length $l_j$, see FIG. 2.

According to the proposed method, the constancy of the roll speeds over time is now examined first. For each roll stand 10, the mean roll speed during the rolling of a tube R is determined:

$$\overline{n_i^{ges}} = \frac{1}{t_{ges}} \int_0^{t_{ges}} (n_i(t))dt \qquad (2)$$

Here, $\overline{n_i^{ges}}$ denotes the mean roll speed of the i-th roll stand 10 during rolling, $n_i(t)$ denotes the roll speed of the i-th roll stand 10 at time t, and $t_{ges}$ denotes the total rolling time for the tube R.

The current roll speeds needed to form the mean value are taken by the controller 2, for example from the data memory of the drive motor control.

As the next step, the system examines the greatest deviations of the roll speeds of a roll stand 10 from the respective mean value:

$$\Delta_i = \left[\frac{\max(n_i(t)|_0^{t_{ges}} - \min(n_i(t))|_0^{t_{ges}}}{\overline{n_i^{ges}}}\right] \qquad (3)$$

If this value is less than a lower tolerance limit, for example 1%, it is assumed that the roll speeds were sufficiently constant during rolling, and the back-calculation of the shell wall thickness $s_{ij}$ can now be started for each tube section length $l_j$ and wall thickness $s_{rj}$:

$$s_{ij} = F^{-1}(\overline{n_i^{ges}}, s_{rj}) \qquad (4)$$

If the roll speeds had an invalid range of changes, the speed curve is gradually divided into time segments until the current speeds deviate only slightly from the mean speed in the sub-ranges, i.e., the criterion suggested above is satisfied, if possible, according to equation (3).

To do that, the procedure goes as follows:

A mean tube wall thickness for the entire tube R is formed from the tube wall thickness profile on the outlet-side, e.g., according to the following approach:

$$\overline{s_r^{ges}} = \frac{\sum_j (s_{rj} l_j)}{l_r^{ges}} \qquad (5)$$

Here, $l_j$ denotes the length of the measured tube section j with the wall thickness $s_{rj}$ and $l_r^{ges}$ denotes the total length of the tube.

With this mean tube wall thickness, a mean shell wall thickness is now formed in the first approach with the help of the above-mentioned inverse function and the mean roll speeds:

$$\overline{s_1^{ges}} = F^{-1}(\overline{n_i^{ges}}, \overline{s_r^{ges}}) \qquad (6)$$

This mean shell wall thickness may be erroneous but is used as a starting value for further refinement of the solution.

Tube R and shell are each subdivided into the same number of equivalent partial volumes. The measured values of the wall thickness measurement on the outlet-side can be used directly for tube R:

$$V_k = \sum_{j=m}^{n} (\pi(D_r - s_{rj})s_{rj}l_j) \qquad (7)$$

Here, $V_k$ denotes the k-th partial volume between the measured value sections m to n and $D_r$ denotes the tube diameter.

For the shell, the associated partial volume is formed with the help of the shell wall thickness which is determined approximately in the first step:

$$V_k = \sum_{j=m}^{n} (\pi(D_l - s_{rj})s_{rj}l_j) \qquad (8)$$

Here, $x_n$, $x_m$ denote the length coordinates on the shell and $D_l$ denotes the shell diameter.

By the speed measuring device 21 on the inlet-side one can now determine the point in time $t_m$ at which the hollow section or the partial volume $V_k$ between the longitudinal coordinates $x_n$-$x_m$ has entered the stretch-reducing mill 1. In addition, with the aid of the measured values of the outlet-side wall thickness measuring device 20 and the outlet-side speed measuring device 22, it is possible to determine the point in time $t_n$ at which the partial volume $V_k$ has left the stretch-reducing mill. Since the law of constant volume applies to the forming of metallic materials, a tube section on the outlet-side can be clearly assigned to an inlet-side shell section by considering the volumes.

In the next step, the mean wall thickness of the tube R in the partial volume is determined:

$$\overline{d_r^k} = \frac{\sum_{j=m}^{n}(d_{rj}l_j)}{\sum_{j=m}^{n}l_j} \qquad (9)$$

Then, for each roll stand 10, its mean speed is determined during the passage of the partial volume $V_k$:

$$\overline{n_i^k} = \frac{1}{(t_n - t_m)} \int_{t_m}^{t_n} (n_i(t))dt \qquad (10)$$

For each of the sections k, it is now checked whether the speeds within this section were sufficiently constant. The procedure is analogous to the error criterion from equation (3), but now only for the speed deviations in the time segment $t_m$ to $t_n$. The time segments in which the deviations from the respective mean speeds are too high are further subdivided according to the method shown in relations (7) to (10). This subdivision can be repeated until no further improvement in results can be expected.

Finally, each tube wall thickness measured on the outlet-side is assigned to a set of associated mean roll speeds, which either represent the actual speed curve at the time the tube section is rolled in accordance with the error criterion (3) within a permissible fluctuation range, or a deviation of which from the actual speed curve cannot be reduced any further:

$$s_{rj} \rightarrow \overline{n_i^k} \qquad (11)$$

With this relation, a shell wall thickness profile is now calculated using the inverse function:

$$s_{ij} = F^{-1}(\overline{n_i^k}, s_{rj}) \qquad (12)$$

The method presented is only an example and can be modified insofar as it enables one or more of the roll stands 10 to be controlled, taking into account the determined inlet-side wall thicknesses.

As far as applicable, all of the individual features set out in the exemplary embodiments can be combined with one another and/or exchanged.

LIST OF REFERENCE SYMBOLS

1 Stretch-reducing mill
2 Controller
10 Roll stand
20 Wall thickness measuring device
21 Inlet-side speed measuring device
22 Outlet-side speed measuring device
R Tube
F Conveying direction
$s_l$ Wall thickness of the tube on the inlet-side
$s_{l\_t}$ Theoretically determined wall thickness of the tube on the inlet-side
$s_r$ Wall thickness of the tube on the outlet-side

The invention claimed is:

1. A controller (2) for controlling a stretch-reducing mill (1) for the rolling of tubes (R), the stretch-reducing mill (1) having
several roll stands (10) arranged behind one another in a conveying direction (F) of the tubes (R), and
at least one outlet-side wall thickness measuring device (20) for measuring outlet-side wall thicknesses ($s_r$) of tubes (R) exiting from a last of the several roll stands (10),
wherein the controller (2) is configured
to receive measurement data relating to one or more outlet-side wall thicknesses ($s_r$) of a tube (R) exiting from the last of the several roll stands (10) from the wall thickness measuring device (20),
to determine one or more inlet-side wall thicknesses ($s_{l\_t}$) of the tube (R) before entering a first of the several roll stands (10) from the received measurement data, and
to control one or more of the several roll stands (10) taking into account the determined inlet-side wall thicknesses ($s_{l\_t}$).

2. The controller (2) according to claim 1,
wherein the controller (2) is further configured to determine a deviation from one or more setpoint values from the determined inlet-side wall thicknesses ($s_{l\_t}$).

3. The controller (2) according to claim 1,
wherein the control of the one or more of the several roll stands (10) comprises at least a speed regulation of work rolls thereof.

4. The controller (2) according to claim 1,
wherein the controller (2) is further configured to use the determined inlet-side wall thicknesses ($s_{l\_t}$) for a wall thickness control of one or more subsequent tubes (R).

5. The controller (2) according to claim 1,
wherein the controller (2) is further configured to create a forecast of the wall thicknesses of subsequent tubes (R) from the determined inlet-side wall thicknesses ($s_{l\_t}$), and
wherein the creation of the forecast includes an analysis of cyclically recurring and/or statistical regularities.

6. The controller (2) according to claim 1,
wherein the controller (2) is further configured to compare the determined inlet-side wall thicknesses ($s_{l\_t}$) with the measured outlet-side wall thicknesses ($s_r$).

7. The controller (2) according to claim 1,
wherein the controller (2) is further configured to correct the determined wall thicknesses on the inlet-side ($s_{l\_t}$) by considering a measured inlet-side wall thickness mean value, and
wherein the measured inlet-side wall thickness mean value is determined by measuring a weight and/or a length and/or a diameter of one or more incoming tubes (R).

8. The controller (2) according to claim 1,
wherein the stretch-reducing mill (1) furthermore has an inlet-side wall thickness measuring device which is set up to measure an inlet-side wall thicknesses (d1) of tubes (R) entering the first roll stand (10), and
wherein the controller (2) is further configured
to compare one or more measured inlet-side wall thicknesses ($s_l$) with the determined inlet-side wall thicknesses ($s_{l\_t}$), and
to control one or more of the several roll stands (10) taking into account the comparison result to control and/or to detect a malfunction of the stretch-reducing mill (1).

9. A stretch-reducing mill (1) for the rolling of tubes (R), comprising:
several roll stands (10) arranged behind one another in a conveying direction (F) of the tubes (R);
at least one outlet-side wall thickness measuring device (20) for measuring outlet-side wall thicknesses ($s_r$) of tubes (R) exiting from a last of the several roll stands (10); and
the controller (2) according to claim 1.

10. A method for controlling a stretch-reducing mill (1) for the rolling of tubes (R), the stretch-reducing mill (1) having
several roll stands (10) arranged behind one another in a conveying direction (F) of the tubes (R), and
at least one outlet-side wall thickness measuring device (20) for measuring outlet-side wall thicknesses ($s_r$) of tubes (R) exiting from a last of the several roll stands (10), wherein the method comprises:
measuring one or more outlet-side wall thicknesses ($s_r$) of a tube (R) by the wall thickness measuring device (20);
determining, by calculating, one or more inlet-side wall thicknesses ($s_{l\_t}$), of the tube (R) before entering the first roll stand (10) from the measured outlet-side wall thicknesses (sr); and
controlling one or more of the several roll stands (10) taking into account the determined inlet-side wall thicknesses ($s_{l\_t}$).

11. The method according to claim 10,
wherein a deviation from one or more setpoint values is determined from the determined inlet-side wall thicknesses ($s_{l\_t}$).

12. The method according to claim 10,
wherein the determined inlet-side wall thicknesses ($s_{l\_t}$) are used for a wall thickness control of one or more subsequent tubes (R).

13. The method according to claim 10,
wherein a forecast of the wall thicknesses of subsequent tubes (R) is created from the determined inlet-side wall thicknesses ($s_{l\_t}$), which includes an analysis of cyclically recurring and/or statistical regularities.

14. The method according to claim 10,
wherein the determined inlet-side wall thicknesses ($s_{l\_t}$) are compared with the measured outlet-side wall thicknesses ($s_r$).

15. The method according to claim 10,
wherein the determined inlet-side wall thicknesses ($s_{l\_t}$) are corrected by a measured inlet-side wall thickness mean value, and
wherein the measured inlet-side wall thickness mean value is determined by measuring a weight and/or a length and/or a diameter of one or more incoming tubes (R).

* * * * *